United States Patent
McGuire (10) Patent No.: US 11,010,734 B2
(45) Date of Patent: *May 18, 2021

(54) SECURE PAYMENT PROCESSING USING AUTHORIZATION REQUEST

(71) Applicant: Visa International Service Association, San Francisco, CA (US)

(72) Inventor: Keith McGuire, Lyons, CO (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,465

(22) Filed: Oct. 17, 2019

(65) Prior Publication Data
US 2020/0051044 A1 Feb. 13, 2020

Related U.S. Application Data

(63) Continuation of application No. 16/039,670, filed on Jul. 19, 2018, now Pat. No. 10,496,965, which is a (Continued)

(51) Int. Cl.
*G06K 19/00* (2006.01)
*G06Q 20/10* (2012.01)
*G06Q 20/38* (2012.01)

(52) U.S. Cl.
CPC .......... *G06Q 20/10* (2013.01); *G06Q 20/3821* (2013.01)

(58) Field of Classification Search
CPC .......................... G06Q 20/10; G06Q 20/3821
See application file for complete search history.

(56) References Cited

U.S. PATENT DOCUMENTS

| 5,613,012 A | 3/1997 | Hoffman et al. |
| 5,781,438 A | 7/1998 | Lee et al. |

(Continued)

FOREIGN PATENT DOCUMENTS

| EP | 2156397 A1 | 2/2010 |
| WO | 2001035304 A1 | 5/2001 |

(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

(Continued)

*Primary Examiner* — Matthew Mikels
(74) *Attorney, Agent, or Firm* — Kilpatrick Townsend & Stockton LLP (57) ABSTRACT

A payment system that uses replacement account identifiers is disclosed. An encrypted primary account number (PAN) may be received by a secure computer from a data entry device. The encrypted PAN may be decrypted by the secure computer and the secure computer may transmit a zero, nominal or no dollar authorization request to an issuer. Using the zero, nominal or no dollar authorization request, the issuer may verify the account. If the account is verified, then a replacement account identifier can be issued at a later time. The replacement account identifier may be used instead of the actual PAN to conduct payment transactions.

20 Claims, 5 Drawing Sheets

Related U.S. Application Data continuation of application No. 14/600,523, filed on Jan. 20, 2015, now Pat. No. 10,096,009.

(56) References Cited

U.S. PATENT DOCUMENTS

| | | |
|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Newton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin et al. |

(56) References Cited

U.S. PATENT DOCUMENTS

| | | |
|---|---|---|
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 10,096,009 B2 * | 10/2018 | McGuire ................ G06Q 20/10 |
| 10,496,965 B2 * | 12/2019 | McGuire ............ G06Q 20/3821 |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Newton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |

(56) References Cited

U.S. PATENT DOCUMENTS

| | | |
|---|---|---|
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0136796 A1* | 5/2012 | Hammad ............. G06Q 20/385 705/67 |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |

(56) References Cited

U.S. PATENT DOCUMENTS

| | | |
|---|---|---|
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1* | 10/2014 | Patterson ............... G06Q 20/40 705/44 |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

McGuire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

Cash et al., U.S. Appl. No. 15/041,495 (unpublished), Peer Forward Authorization of Digital Requests filed Feb. 11, 2016.

Le Saint et al., U.S. Appl. No. 15/008,388 (unpublished), Methods for Secure Credential Provisioning filed Jan. 27, 2016.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

Aissi et al., U.S. Appl. No. 61/738,832 (unpublished), Management of Sensitive Data filed Dec. 18, 2012.

(56) References Cited

OTHER PUBLICATIONS

Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.

* cited by examiner

SECURE PAYMENT PROCESSING USING AUTHORIZATION REQUEST

CROSS-REFERENCES TO RELATED APPLICATIONS

This application is a continuation of U.S. application Ser. No. 16/039,670, filed Jul. 19, 2018, which is a continuation of Ser. No. 14/600,523, filed Jan. 20, 2015, which is herein incorporated by reference in its entirety for all purposes.

BACKGROUND

Conventional systems and methods for generating replacement account numbers generally include sending an original account number from a requestor computer to a central host computer. The central host computer can then provide the replacement account number to the requester computer. The requestor computer can then use that replacement account number in a payment transaction instead of the original account number.

Systems and methods that use replacement account numbers instead of original account numbers are outside the scope of PCI (payment card industry) requirements, because the original account numbers are not at risk of being obtained by unauthorized persons. Since the methods and systems are outside the scope of PCI requirements, the methods and systems need not implement the stringent security protocols required by PCI.

While conventional systems and methods that use replacement account numbers are useful, a number of improvements can be made. For example, one problem with issuing replacement account numbers is that they can sometimes be issued even though the accounts associated with the account numbers used in the replacement account number requests may not be in good standing. This can impose a significant risk to various entities (e.g., issuers) who manage the accounts, or who might otherwise use the accounts to conduct payment transactions.

Embodiments of the invention address this and other problems, individually and collectively.

BRIEF SUMMARY

Embodiments of the present invention relate to systems and methods for providing better data and transaction security when processing payment transactions.

One embodiment of the invention is directed to a method. The method includes receiving, by a management computer, an authorization identifier. The authorization identifier is generated by an authorization computer after the authorization computer receives an authorization request message comprising an original account identifier (e.g., a PAN or primary account number) and a zero, nominal, or no dollar amount. The method also includes generating a replacement account identifier request message and sending the replacement account identifier request message to a payment processing computer. The method also includes receiving, by the management computer, in response to transmitting the replacement account identifier request message, a replacement account identifier response message comprising the replacement account identifier. The replacement account identifier can then be used to conduct payment transactions instead of the original account identifier.

Another embodiment of the invention is directed to a management computer comprising a processor and a computer readable medium coupled to the processor. The computer readable medium comprises code, executable by the processor to implement a method. The method comprises receiving an authorization identifier. The authorization identifier is generated by an authorization computer after the authorization computer receives an authorization request message comprising an original account identifier and a zero, nominal or no dollar amount. The method also includes generating a replacement account identifier request message, and transmitting the replacement account identifier request message to a payment processing computer. The method further comprises receiving, in response to transmitting the replacement account identifier request message, a replacement account identifier response message comprising the replacement account identifier. The replacement account identifier may thereafter be used to conduct payment transactions instead of the original account identifier.

Another embodiment of the invention is directed to a system comprising a local workstation and a management computer in communication with the local workstation. The management computer comprises a processor and a computer readable medium coupled to the processor. The computer readable medium comprises code, executable by the processor to implement a method. The method includes receiving an authorization identifier from the workstation. The authorization identifier is generated by an authorization computer after the authorization computer receives an authorization request message comprising an original account identifier and a zero, nominal or no dollar amount. The method also includes generating a replacement account identifier request message, transmitting the replacement account identifier request message to a payment processing computer, and receiving, in response to transmitting the replacement account identifier request message, a replacement account identifier response message comprising the replacement account identifier. The replacement account identifier may be used instead of the original account identifier to conduct transactions.

These and other embodiments of the invention are described in further detail below.

DETAILED DESCRIPTION

One embodiment of the invention is directed to a method that includes receiving, by a workstation and from a data entry device in a merchant system, an encrypted payment account identifier. Prior to receipt by the workstation, the encrypted payment account identifier was formed by encrypting an original account identifier at the data entry device.

The workstation may generate an authorization request message comprising an original account identifier and a zero, nominal or no dollar amount, and may transmit it to a payment processing computer. A "zero" dollar authorization request message is an authorization request message that has a zero in the amount data field. An authorization request message with a "no dollar" amount means that there is no dollar value in the amount data field in the authorization request message. A "nominal" dollar amount can relate to an amount that is not indicative of a normal transaction in the environment in which transactions are normally conducted by the merchant system. As such, the nominal dollar amount cannot be mistaken for a real transaction amount that might be processed by the merchant system. For example, if a cable TV provider sends always sends transaction amounts greater than $10, then any amount less than this may be a nominal dollar amount. Typically, a nominal dollar amount might be $1 or $0.01 (or any suitable value less than $2 or $1).

The authorization request message comprising the encrypted payment account identifier may then be transmitted to a payment processing computer. The payment processing computer then decrypts the encrypted payment account identifier to obtain the original unencrypted payment account identifier. After the payment processing computer obtains the unencrypted payment account identifier, it may generate an authorization request message comprising an original account identifier and the zero, nominal or no dollar amount.

In some embodiments, the payment processing computer may then transmit the authorization request message to an issuer computer via an acquirer computer and a payment processing network. The issuer computer may verify that the account exists and is otherwise in good standing. Once the account has been verified by the issuer computer, the issuer computer may transmit an authorization response message comprising an authorization identifier to the payment processing computer. The authorization identifier may then be provided to the workstation, and the workstation may provide it to an order management computer.

After the order management computer receives the authorization identifier, it may generate a replacement account identifier request message and transmit it to the payment processing computer. The payment processing computer may determine a replacement account identifier in response to receiving the authorization identifier. Once it is determined, the payment processing computer may then transmit it to the order management computer. The order management computer may then receive a replacement account identifier response message comprising a replacement account identifier for the original account identifier.

The replacement account identifier may be stored at the order management computer to conduct recurring or non-recurring payment transactions. For example, in some embodiments, the order management computer may periodically send requests including the replacement account identifiers and transaction amounts to the payment processing computer to obtain authorizations for the recurring transactions.

In a specific transaction, the payment processing computer may receive an authorization request message comprising the replacement account identifier and a transaction amount from the order management computer. It may then generate a modified authorization request message including the original account identifier and the transaction amount. It may then transmit it to the issuer computer via an acquirer computer and a payment processing network. The issuer may then respond to the authorization request message by transmitting an authorization response message back to the payment processing computer via the payment processing network and the acquirer computer.

At the end of the day or at some other suitable period of time, a clearing and settlement process between the payment processing network, the acquirer computer, and the issuer computer may take place.

As noted above, in embodiments of the invention, the original account identifier is not maintained by the order management computer. The original account identifier only passes through an original data entry device and local workstation one time, in an encrypted format. Only the replacement account identifier is used thereafter. Further, before the replacement account identifier is actually used for purchasing, the account associated with the original account identifier is verified. The verification of the status of the account can advantageously be obtained using a traditional credit and debit card payments infrastructure, before any replacement account identifiers are issued and used for payment transactions.

Before discussing specific embodiments of the invention, some terms may be discussed in further detail.

"Payment account information" may be any information that identifies or is associated with a payment account. Payment account information may be provided in order to make a payment from a payment account. Some examples of payment account information include one or more of a PAN (primary account number), a CVV (card verification value), a dCVV (dynamic card verification value), a user name, an expiration date, a gift card number or code, etc.

An "original account identifier" may include a transactable identifier associated with a payment account that directly represents the payment account. For example, an original account identifier may be a primary account number (PAN) issued by an issuer for a card account (e.g., credit card, debit card, etc.). For instance, in some embodiments, an original account identifier may include a sixteen digit numerical value such as "4147 0900 0000 1234." The first six digits of the real account identifier (e.g., "414709"), may represent a real issuer identifier (e.g., a "BIN" or bank identification number) that may identify an issuer associated with the real account identifier.

A "replacement account identifier" may include an identifier for a payment account that is a substitute for an account identifier, such as an original account identifier or a primary account number (PAN). The replacement account identifier may have the same or different format as the primary account number. In some embodiments, the replacement account identifier may be a subscription ID, when the replacement account identifier is to be used for recurring payment transactions (as in the case of a subscription that utilizes a recurring payment authorization to maintain the subscription). In other embodiments, the replacement account identifier may include a series of alphanumeric characters that may be used as a substitute for an original account identifier. For example, a replacement account identifier "4900 0000 0000 0001" may be used in place of a PAN "4147 0900 0000 1234." In some embodiments, a replacement account identifier may be "format preserving" and may have a numeric format that conforms to the account identifiers used in existing payment processing networks (e.g., ISO 8583 financial transaction message format). In some embodiments, a replacement account identifier may be used in place of a PAN to initiate, authorize, settle or resolve a payment transaction or represent the original credential in other systems where the original credential would typically be provided. In some embodiments, a replacement account identifier value may be generated such that the recovery of the original PAN or other account identifier from the replacement account identifier value may not be computationally derived. Further, in some embodiments, the replacement account identifier format may be configured to allow the entity receiving the replacement account identifier to identify it as a replacement account identifier and recognize the entity that issued the replacement account identifier.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device (or other computer) that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

An "authorization computer" may include any suitable computer that can perform authorization processing. For example, an issuer computer is an example of an authorization computer. The issuer computer may authorize transactions by analyzing data in authorization request messages.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer.

Figure 1:
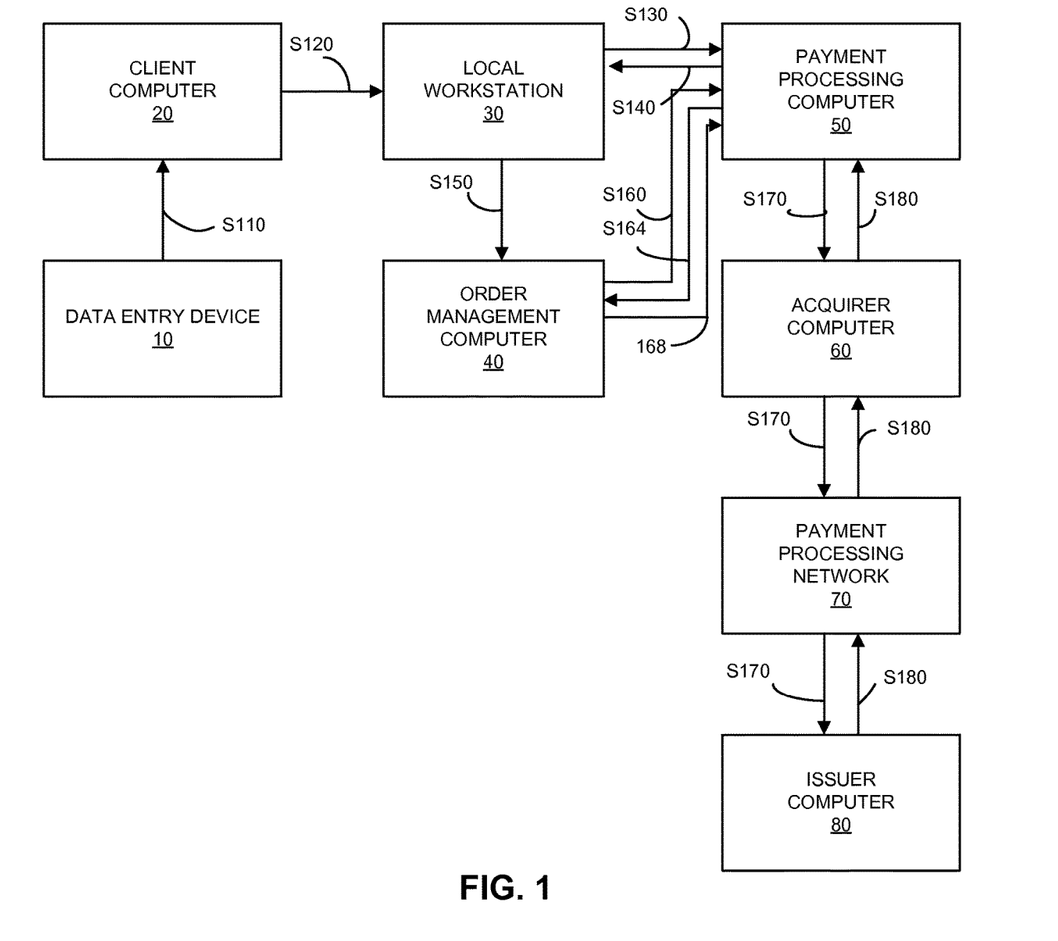
FIG. 1 shows a block diagram of a system according to an embodiment of the invention.

FIG. 1 shows a system according to an embodiment of the invention. The system may include a merchant system which may include client computer 20 and a data entry device 10 coupled to the client computer 20. The client computer 20 and the data entry device 10 may be used by a user (e.g., a call center employee) at a merchant. In some embodiments, the data entry device 10 may be a keyboard. It may comprise encryption software so that sensitive data such as original account identifier information can be encrypted. The merchant system may also comprise a local workstation 30 and an order management computer 40 in communication with the client computer 20. The local workstation 30 may service a number of different client computers, and the order management computer 40 may service one or more local workstations. Although in some embodiments of the invention, the data entry device 10, the client computer 20, the local workstation 30, and the client computer 40 are in or part of a merchant system, they may be part of other systems in other embodiments of the invention.

The system in FIG. 1 may also have a payment processing computer 50 which may be coupled to the local workstation 30 and the order management computer 40. In some embodiments, the payment processing computer 50 may receive authorization requests and provide responses to the local workstation 30 and the order management computer 40. In some embodiments, the local workstation 30 may be part of the order management computer 40. The payment processing computer 50 may also include or operate a database which may correlate replacement account identifier data with original account identifier data.

In addition to being in communication with the local workstation 30 and the order management computer 40, the payment processing computer 50 may also be in communication with an issuer computer 80 via an acquirer computer 60 and a payment processing network 70. The payment processing computer 50 may be part of a secure transaction system, which may or may not include the issuer computer 80, the acquirer computer 60 and the payment processing network 70. Transmission and storage of original account identifiers may be secure in the payment processing computer 50, the issuer computer 80, the acquirer computer 60 and/or the payment processing network 70

The payment processing network 70 may include data processing subsystems, networks, and operations used to support and deliver authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Any suitable number or types of communication networks may be present between the computers and devices shown in FIG. 1. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2A:
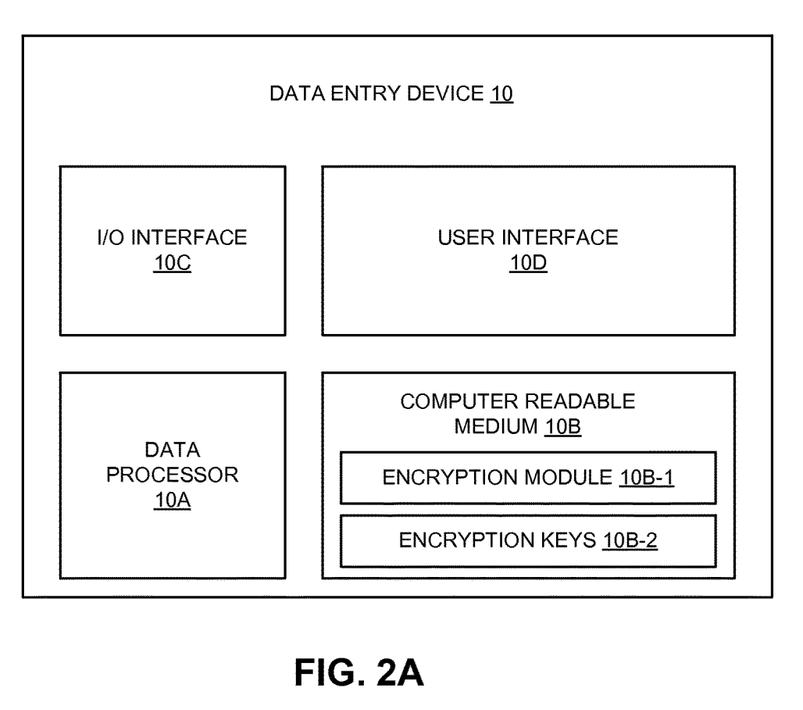
FIG. 2A is a block diagram showing components of a data entry device according to an embodiment of the invention.

FIG. 2A is a block diagram showing components of a data entry device 10 according to an embodiment of the invention. The data entry device 10 comprises a data processor 10A, a computer readable medium 10B, an I/O interface 10C, and a user interface 10D (e.g., a keyboard, a touchscreen, microphone, etc.) coupled to the data processor 10A. The computer readable medium 10B comprises an encryption module 10B-1 and encryption keys 10B-2.

Computer readable media can include both volatile and nonvolatile media, both removable and non-removable media, and both local and remote media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile discs (DVD) or other optical disc storage, magnetic cassettes, magnetic tape, magnetic disc storage or other magnetic storage devices, or any other medium.

The encryption module 10B-1 may comprise code, executable by the data processor 10A, to encrypt data such as primary account numbers. It may include code for performing any suitable and known encryption process including DES, triple DES, AES, etc.

Figure 2B:
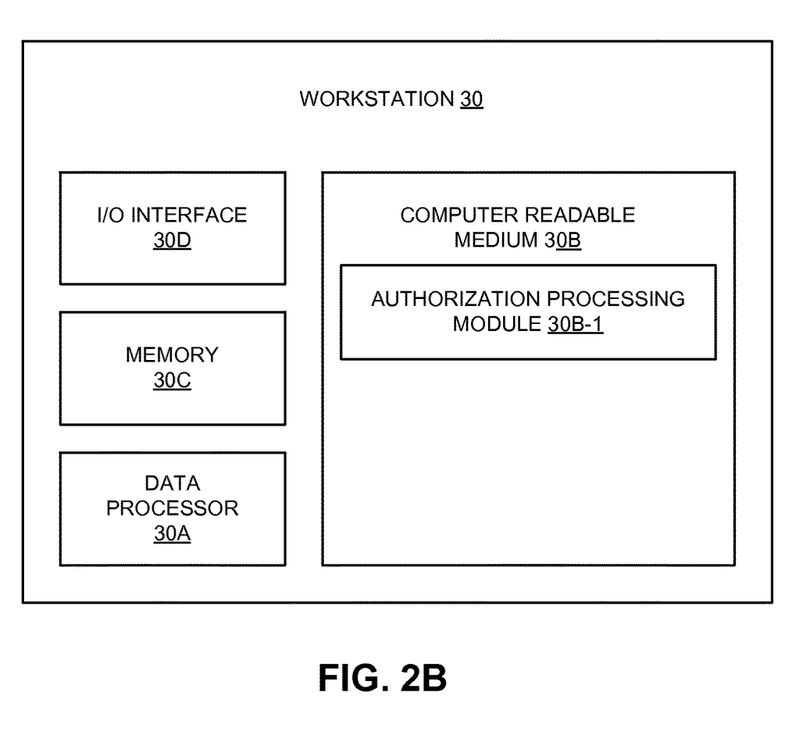
FIG. 2B is a block diagram showing components of a workstation according to an embodiment of the invention.

FIG. 2B is a block diagram showing components of a workstation 30 according to an embodiment of the invention. The workstation 30 comprises a data processor 30A, a computer readable medium 30B, a memory 30C, and an I/O interface 30D coupled to the data processor 30A. The computer readable medium 30B comprises an authorization processing module 30B-1. The authorization processing module 30B-1 may have code, executable by the data processor 30A to perform authorization processing. Authorization processing may include the generation, transmission, and/or receipt of payment transaction authorization request and response messages.

Figure 2C:
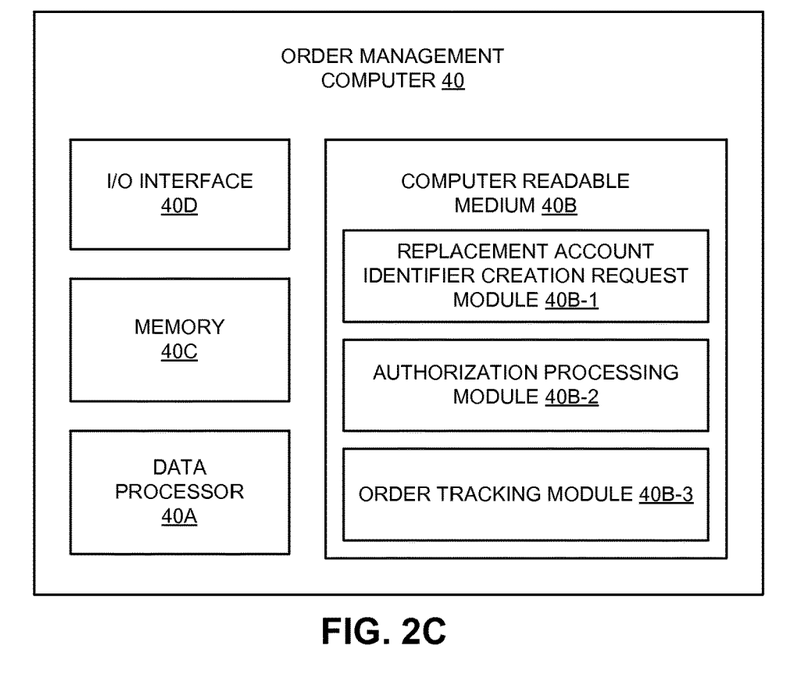
FIG. 2C is a block diagram showing components of an order management computer according to an embodiment of the invention.

FIG. 2C is a block diagram showing components of an order management computer 40 according to an embodiment of the invention. The order management computer 40 comprises a data processor 40A, a computer readable medium 40B, a memory 40C, and an I/O interface 40D coupled to the data processor 40A. The computer readable medium 40B comprises a replacement account identifier creation request module 40B-1, an authorization processing module 40B-2, and an order tracking module 40B-3. The order management computer 40 is an example of a management computer, where the management computer may manage any suitable type of data and may perform any or all of the functions of the order management computer 40B-2, as well as additional functions.

The replacement account identifier creation request module 40B-1 may comprise code, executable by the data processor 40A to create a replacement account identifier request message. The replacement account identifier request message may request a replacement account identifier such as a subscription ID.

The replacement account identifier may be requested or provided to another computer using any suitable form of communication. In some embodiments, a replacement account identifier request may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The replacement account identifier may be directed to any suitable location, such as an e-mail address, a telephone number, an internet protocol (IP) address, or a uniform resource locator (URL). In some embodiments, the replacement account identifier request may comprise a mix of different message types, such as both email and SMS messages.

The authorization processing module 40B-2 may comprise code, executable by the data processor 40A to perform authorization processing. Authorization processing may include the generation, transmission, and/or receipt of payment transaction authorization request and response messages.

The order tracking module 40B-3 may comprise code, executable by the data processor 40A, to track and manage orders associated with a particular account, subscription ID, or individual.

Figure 2D:
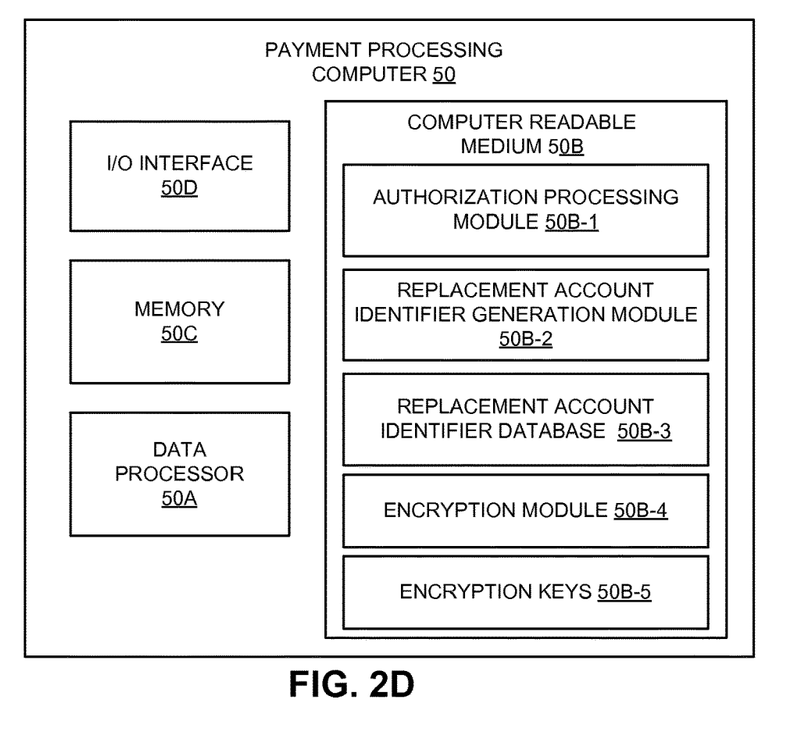
FIG. 2D is a block diagram showing components of a payment processing computer according to an embodiment of the invention.

FIG. 2D is a block diagram showing components of a payment processing computer 50 according to an embodiment of the invention. The payment processing computer 50 comprises a data processor 50A, a computer readable medium 50B, a memory 50C, and an I/O interface 50D coupled to the data processor 50A. The computer readable medium 50B comprises an authorization processing module 50B-1, a replacement account identifier generation module 50B-2, a replacement account identifier database 50B-3, an encryption module 50B-4, and encryption keys 50B-5.

The authorization processing module 50B-1 may include code that is similar to the code in the previously described authorization processing modules 30B-1, 40B-1.

The replacement account identifier generation module 50B-1 may include code, executable by the data processor 50A, that can generate replacement account identifiers. Replacement account identifiers may be generated using an algorithm that converts real PANs into replacement account identifiers. In another example, a listing of replacement account identifiers may be generated in advance and they may be associated with actual PANs over time. In the latter case, the replacement account identifier may be generated in batch, rather than on a per account basis.

The replacement account identifier database 50B-3 may store data tables that map the replacement account identifiers to the PANs. The database 50B-3 may be a conventional, fault tolerant, relational, scalable, secure database such as Oracle™ or Sybase™.

The encryption/decryption module 50B-4 may comprise code, executable by the data processor 50A to encrypt or decrypt data. It may comprise code for performing any suitable encryption and/or decryption process using DES, triple DES, AES, or any other suitable encryption algorithm. In embodiments of the invention, the encryption/decryption module may comprise code for decrypting an encrypted PAN that is received from a merchant's data entry device.

Figure 3:
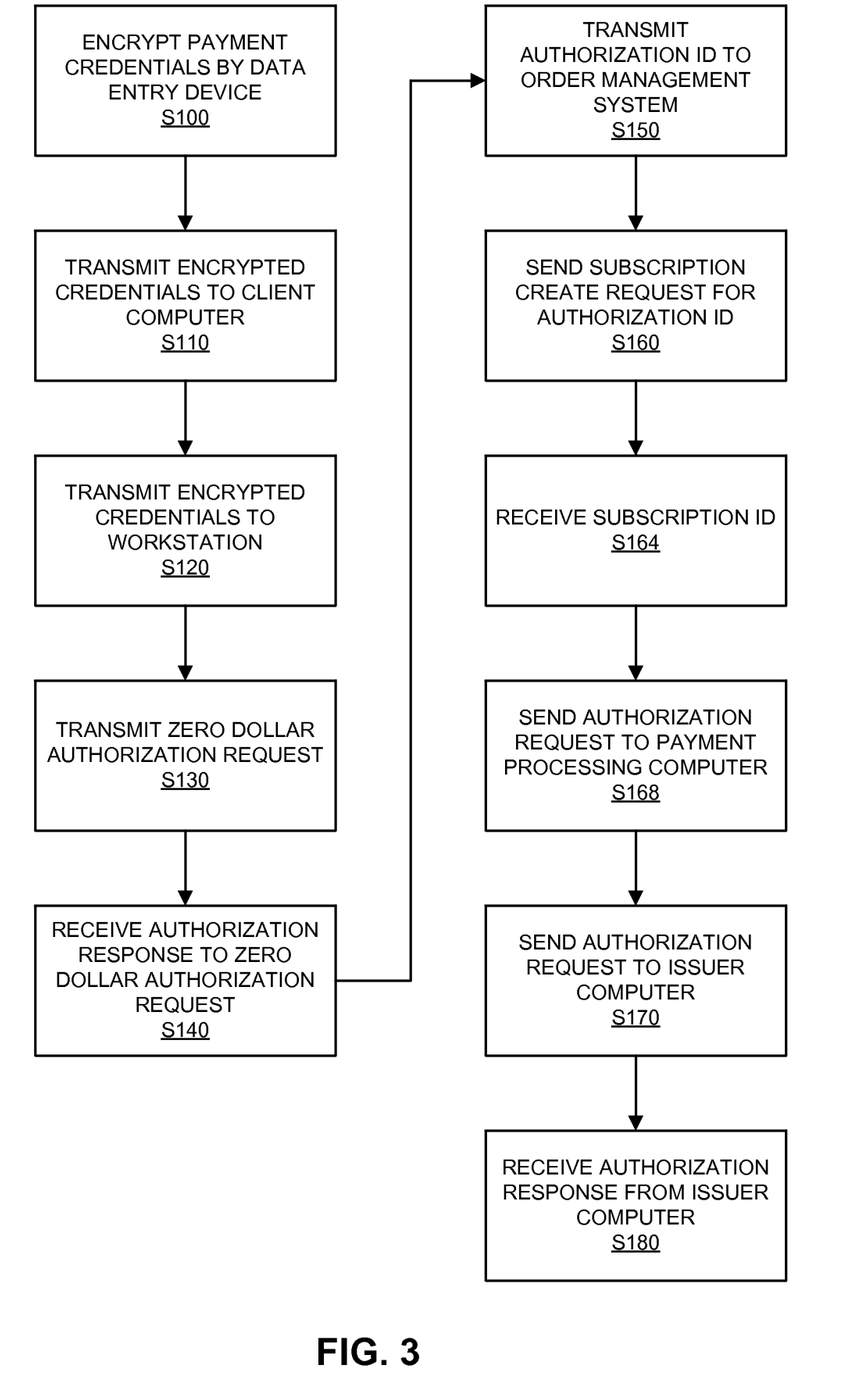
FIG. 3 is a flowchart illustrating methods according to embodiments of the invention.

FIG. 3 is a flowchart illustrating methods according to embodiments of the invention. Methods according to embodiments of the invention may be described with reference to FIGS. 1-3. The methods described below relate to the entry of data into a data entry device by a merchant employee such as a call center employee. However, embodiments of the invention are not limited to the specifically described embodiments. For example, embodiments of the invention can be utilized without the use of a call center. In addition, although the use of a recurring payment is described in detail, embodiments of the invention are not limited to recurring payment transactions. Lastly, although the methods described below include steps that are described in a particular order, it is understood that the steps may occur in other sequences and may still be within embodiments of the invention.

In an embodiment of the invention, a consumer may contact a user operating the client computer 20 and the data entry device 10. For example, the user may be a call center employee acting on behalf of a merchant. The consumer can call the user to place an order for a good or service offered by the merchant. During the call, the consumer may provide the user with their credit card number and the expiration date associated with the credit card number (or any other suitable combination of payment credentials or account information). After the user receives this information, the user may then key in this information into the data entry device 10. In some embodiments, the data entry device 10 may be a keypad and the client computer 20 can be a desktop computer coupled to the keypad.

In step S100, after an original account identifier (e.g., a PAN) and the expiration date are keyed into the user interface 10D (e.g., keys) of the data entry device 100 (e.g., a keyboard) by the user, they are encrypted by the data entry device 100. The encryption module 10B-1 stored on the computer readable medium 10B may comprise encryption software that uses an encryption algorithm and one or more stored encryption keys 10B-2 to encrypt the original account identifier and the expiration date to form an encrypted payload.

In steps S110 and S120, the encrypted payload containing the encrypted original account identifier and the encrypted expiration date are sent to the local workstation 30 via the user's client computer 20.

In step S130, the local workstation 30 receives the encrypted payload. The local workstation 30 then uses the authorization processing module 30B-1 and the data processor 30A to generate a first authorization request message comprising the encrypted payload and a zero, nominal or no dollar transaction amount. The local workstation 30 then sends the zero, nominal or one dollar first authorization request message to the payment processing computer 60.

The zero, nominal or no dollar first authorization request message may include any suitable information. For example, it may include one or more of: (a) the encrypted payload received from the data entry device 10 (e.g., the encrypted card number and expiration date), (b) a merchant reference number, (c) a "bill to" name and address (these can be set to dummy values), (d) a device type or identifier for the device that captured the payment account information, (e) an indication of the encryption algorithm used to encrypt the payment account information, (f) an indication of any other encoding methods used, (g) an indication of the entry mode (keyed vs. swipe) used to obtain the account information, (h) an indication of the capabilities of the data entry device 10, and (i) a card present indicator (yes or no).

After the payment processing computer 60 receives the zero, nominal or no dollar authorization request message, the payment processing computer 60 decrypts the encrypted original account identifier and modifies the zero, nominal or no dollar authorization request message so that it excludes the encrypted original account identifier and includes the unencrypted original account identifier. The encryption module 50B-4 and one or more encryption keys 50B-5 may be used for this purpose. The modified zero, nominal or no dollar first authorization request message is then sent to the issuer computer 80 via the acquirer computer 60 and the payment processing network 70.

The issuer computer 80 may then verify that the account associated with the original account number is in good standing. This can occur using any suitable process. Examples of processes include AVS (account verification service) checks, fraud checks, etc. The issuer computer 80 may include a data processor, and a computer readable medium coupled to the data processor. The computer readable medium may store any suitable number of software modules, including, but not limited to, a fraud processing module, an authorization module and an account verification module.

After the issuer computer 80 determines that the original account number is in good standing, it may then generate a first authorization response message with an authorization identifier. The first authorization response message may comprise the unencrypted original account identifier. The first authorization response message may be sent by the issuer computer 80 to payment processing computer 50 via the payment processing network 70 and the acquirer computer 60. It may include the real account identifier. The payment processing computer 50 may then modify the first authorization response message so that it excludes the unencrypted original account identifier includes the encrypted original account identifier and the authorization identifier.

In step S140, the local workstation 30 then receives the first authorization response message including the authorization identifier from the payment processing computer 50.

In step S150, the user, using the client computer 20, the local workstation 30, and optionally the data entry device 10, inputs the authorization identifier into an electronic form provided by the order management computer 40. The appropriate form may be provided on a display in the client computer 20 by the order management computer 40. The authorization identifier may be input into the electronic form using any suitable process including manual data entry, automatic form filling, or the cutting and pasting of data using a device such as a computer mouse.

In step S160, using the replacement account identifier request module 50B-2, the order management computer 40 generates and sends a subscription create request message including the authorization identifier to the payment processing computer 50.

After receiving the subscription create request message, the payment processing computer 50, using the replacement account identifier generation module 50B-2, generates the replacement account identifier in the form of a subscription identifier and transmits it to the order management computer 40. The subscription identifier may be any suitable set of characters that may identify a subscription that is associated with the consumer. In some embodiments, the subscription identifier may be an example of a replacement account identifier that can be used in place of the original account identifier (whether in an encrypted or unencrypted form).

In step S164, the subscription identifier is received by the order management computer 40.

In step S168, after receiving the subscription identifier, the order management computer 40 generates and sends a second authorization request message, for the full order amount, to the payment processing computer 50 with the subscription identifier.

In step S170, the payment processing computer 50 sends the second authorization request message to the issuer computer 80 via the acquirer computer 60 and the payment processing network 70. Prior to sending the second authorization request message to the issuer computer 80, the payment processing computer 50 may modify the second authorization request message by replacing (or excluding) the subscription identifier with the original account identifier. Once the second authorization request message is received by the issuer computer 80, the issuer computer 80 may analyze the second authorization request message to determine if the transaction should be authorized or not. After analyzing the second authorization request message, the issuer computer may generate a second authorization response message indicating whether or not the transaction is approved or declined.

In step 180, the second authorization response message that was sent by the issuer computer 80 is received at the payment processing computer 50. The payment processing computer 50 processes the authorization with the data stores in the subscription profile and returns the result to the local workstation 30 and the client computer 20.

Before or after the second authorization request message is transmitted to the issuer computer 80 by the payment processing computer 50, the previously received original account identifier and expiration date may be stored along with the subscription ID (or other replacement account identifier) in the replacement account identifier database 50B-3. The replacement account identifier database 50B-3 may thus contain links between unencrypted payment account information and replacement account identifiers. The placement account identifier database 50B-3 can serve as a replacement account identifier vault for processing future payment transactions using the replacement account identifiers.

At the end of the day or at some other suitable period of time, a clearing and settlement process occurs between the acquirer computer 60, the payment processing network 70, and the issuer computer 80.

The various participants and elements described herein with reference to FIG. 1 may operate one or more computer apparatuses to facilitate the functions described herein. Any of the elements in FIG. 1, including any servers or databases, may use any suitable number of subsystems to facilitate the functions described herein.

Figure 4:
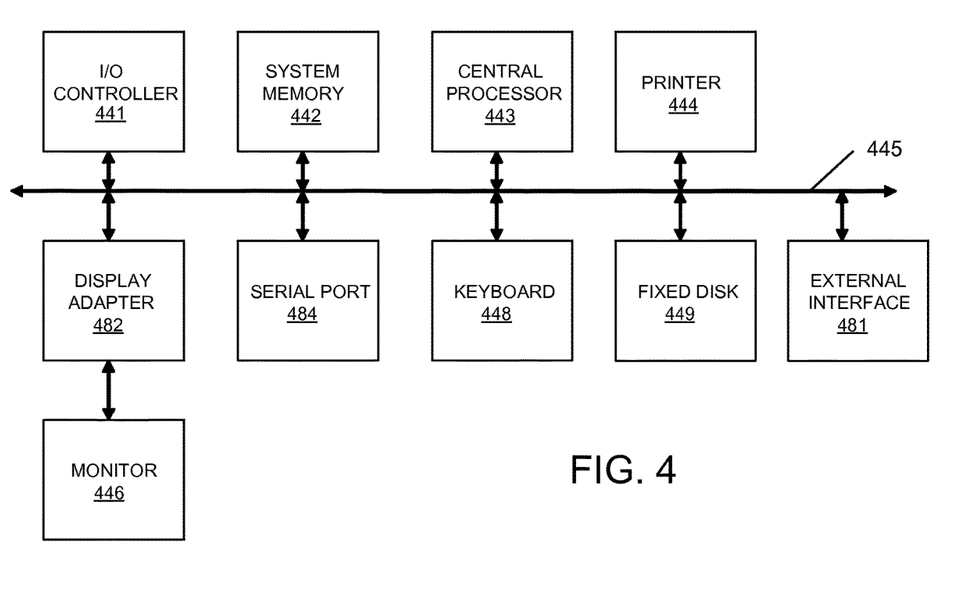
FIG. 4 is a block diagram of a computer apparatus.

Examples of such subsystems or components are shown in FIG. 4. The subsystems shown in FIG. 4 are interconnected via a system bus 445. Additional subsystems such as a printer 444, keyboard 448, fixed disk 449 (or other memory comprising computer readable media), monitor 446, which is coupled to display adapter 482, and others are shown. Peripherals and input/output (I/O) devices, which couple to I/O controller 441 (which can be a processor or other suitable controller), can be connected to the computer system by any number of means known in the art, such as serial port 484. For example, serial port 484 or external interface 481 can be used to connect the computer apparatus to a wide area network such as the Internet, a mouse input device, or a scanner. The interconnection via system bus allows the central processor 443 to communicate with each subsystem and to control the execution of instructions from system memory 442 or the fixed disk 449, as well as the exchange of information between subsystems. The system memory 442 and/or the fixed disk 449 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Embodiments of the invention have a number of advantages. As noted above, in embodiments of the invention, the original account identifier (e.g., an unencrypted PAN) is encrypted at the point of entry to the merchant system and is not maintained or stored in the merchant system. Existing payment processing system channels can be used to verify the account before providing a replacement account identifier to the merchant system. Since the replacement account identifier is thereafter used for transaction processing, the merchant system can securely and efficiently process transactions while reducing the likelihood of future transaction declines by issuers. Systems according to embodiments of the invention can be considered outside the scope of PCI requirements.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a processing computer, a replacement account identifier request message from a management computer, the replacement account identifier request message includes an authorization identifier generated by an authorization computer after the authorization computer receives a first authorization request message comprising an original account identifier and a first transaction amount;
   determining, by the processing computer, a replacement account identifier;

generating, by the processing computer, a replacement account identifier response message including the replacement account identifier;

transmitting, by the processing computer, the replacement account identifier response message including the replacement account identifier to the management computer;

receiving, by the processing computer from the management computer, a second authorization request message comprising a second transaction amount and the replacement account identifier to authorize a second transaction;

generating, by the processing computer, a modified second authorization request message including the second transaction amount and the original account identifier instead of the replacement account identifier;

transmitting, by the processing computer, the modified second authorization request message to the authorization computer;

receiving, by the processing computer, a second authorization response message authorizing or declining the second transaction;

generating, by the processing computer, a modified second authorization response message including an indication that the second transaction is authorized or declined and the replacement account identifier instead of the original account identifier; and transmitting, by the processing computer to the management computer, the modified second authorization response message.

2. The method of claim 1, further comprising, prior to receiving the replacement account identifier request message:

receiving, by the processing computer from the management computer, the first authorization request message comprising the original account identifier and the first transaction amount;

transmitting, by the processing computer to the authorization computer, the first authorization request message;

receiving, by the processing computer from the authorization computer, a first authorization response message including the authorization identifier; and transmitting, by the processing computer to the management computer, the first authorization response message including the authorization identifier.

3. The method of claim 1, further comprising, prior to receiving the replacement account identifier request message:

receiving, by the processing computer, the authorization identifier from the authorization computer after the authorization computer processes the first authorization request message.

4. The method of claim 1, further comprising, prior to receiving the replacement account identifier request message:

transmitting, by the processing computer to the management computer, a first authorization response message including the original account identifier.

5. The method of claim 1, further comprising:

receiving, by the processing computer, the first authorization request message and the replacement account identifier request message in a same communication from the management computer.

6. The method of claim 1, wherein the original account identifier is an encrypted original account identifier and wherein the first authorization request message comprises the encrypted original account identifier.

7. The method of claim 6, further comprising:

decrypting, by the processing computer, the encrypted original account identifier to obtain a decrypted original account identifier; and modifying, by the processing computer, the first authorization request message to include the decrypted original account identifier prior to forwarding the first authorization request message to the authorizing computer.

8. The method of claim 1, wherein the second transaction is a recurring payment transaction.

9. The method of claim 1, further comprising:

storing, by the processing computer, a mapping between the original account identifier and the replacement account identifier at a database controlled by the processing computer.

10. The method of claim 1, wherein determining the replacement account identifier comprises:

generating the replacement account identifier using an algorithm that converts the original account identifier into the replacement account identifier.

11. The method of claim 1, wherein determining the replacement account identifier comprises:

identifying the replacement account identifier on a list of pre-generated replacement account identifiers; and assigning the replacement account identifier to the original account identifier.

12. The method of claim 1, wherein the first transaction amount is zero.

13. A processing computer comprising:

a processor; and a computer readable medium coupled to the processor, the computer readable medium comprising code that, when executed by the processor, causes the processor to:

receive a replacement account identifier request message from a management computer, the replacement account identifier request message includes an authorization identifier generated by an authorization computer after the authorization computer receives a first authorization request message comprising an original account identifier and a first transaction amount;

determine a replacement account identifier;

generate a replacement account identifier response message including the replacement account identifier;

transmit the replacement account identifier response message including the replacement account identifier to the management computer;

receive, from the management computer, a second authorization request message comprising a second transaction amount and the replacement account identifier to authorize a second transaction;

generate a modified second authorization request message including the second transaction amount and the original account identifier instead of the replacement account identifier;

transmit the modified second authorization request message to the authorization computer;

receive a second authorization response message authorizing or declining the second transaction;

generate a modified second authorization response message including an indication that the second transaction is authorized or declined and the replacement account identifier instead of the original account identifier; and transmit, to the management computer, the modified second authorization response message.

14. The processing computer of claim 13, wherein the original account identifier is an encrypted original account identifier and wherein the first authorization request message comprises the encrypted original account identifier, and wherein the code, when executed by the processor, further causes the processor to:

decrypt the encrypted original account identifier to obtain a decrypted original account identifier; and modify the first authorization request message to include the decrypted original account identifier prior to forwarding the first authorization request message to the authorizing computer.

15. The processing computer of claim 13, wherein the authorization computer is an issuer computer of an issuer that issued an account identified by the original account identifier.

16. The processing computer of claim 13, wherein the code, when executed by the processor, further causes the processor to:

manage a database storing a mapping between the original account identifier and the replacement account identifier.

17. The processing computer of claim 13, wherein determining the replacement account identifier comprises:

generating the replacement account identifier using an algorithm that converts the original account identifier into the replacement account identifier; or identifying the replacement account identifier on a list of pre-generated replacement account identifiers; and assigning the replacement account identifier to the original account identifier.

18. The processing computer of claim 13, wherein the first transaction amount is a nominal amount.

19. The processing computer of claim 13, wherein the replacement account identifier request message is a request for creating a subscription that utilizes a recurring payment authorization to maintain the subscription, and wherein the second transaction is a recurring payment transaction.

20. The processing computer of claim 13, wherein the code, when executed by the processor, further causes the processor to:

prior to receiving the replacement account identifier request message:

receive, from the management computer, the first authorization request message comprising the original account identifier in an encrypted format and the first transaction amount;

decrypt the original account identifier to obtain the original account identifier in a decrypted format;

transmit, to the authorization computer, the first authorization request message including the original account identifier in the decrypted format;

receive, from the authorization computer, a first authorization response message including the authorization identifier; and transmit the first authorization response message including the authorization identifier to the management computer.

* * * * *